United States Patent [19]

Vicik

[11] Patent Number: 5,344,679
[45] Date of Patent: Sep. 6, 1994

[54] AMORPHOUS NYLON COPOLYMER AND COPOLYAMIDE FILMS AND BLENDS

[75] Inventor: Stephen J. Vicik, Darien, Ill.
[73] Assignee: Viskase Corporation, Chicago, Ill.
[21] Appl. No.: 685,950
[22] Filed: Apr. 16, 1991

Related U.S. Application Data

[62] Division of Ser. No. 235,258, Aug. 23, 1988, Pat. No. 5,053,259.
[51] Int. Cl.$^5$ .......................... B29D 7/01; C08L 77/00
[52] U.S. Cl. ................... 428/36.91; 428/910; 525/432
[58] Field of Search ............. 525/432; 428/36.91, 428/910

[56] References Cited

U.S. PATENT DOCUMENTS

| | | | |
|---|---|---|---|
| 3,382,216 | 5/1968 | Blaschke et al. | 528/339 |
| 3,456,044 | 7/1969 | Pahlke | 264/25 |
| 3,516,900 | 6/1970 | Mallonee et al. | 428/296 |
| 3,642,941 | 2/1972 | Schneider et al. | 525/432 |
| 3,741,253 | 6/1973 | Brax et al. | 138/137 |
| 4,044,187 | 8/1977 | Kremkau | 428/212 |
| 4,095,012 | 6/1978 | Schirmer | 428/475.5 |
| 4,104,404 | 8/1978 | Bieler et al. | 428/35.2 |
| 4,303,711 | 12/1981 | Erk et al. | 428/34.1 |
| 4,486,507 | 12/1984 | Schumacher | 428/476.1 |
| 4,532,100 | 7/1985 | Lancaster et al. | 264/564 |
| 4,536,541 | 8/1985 | Latham | 525/66 |
| 4,560,520 | 12/1985 | Erk et al. | 138/118.1 |
| 4,615,922 | 10/1986 | Newsome et al. | 428/475.5 |
| 4,647,483 | 3/1987 | Tse et al. | 428/475.8 |
| 4,652,490 | 3/1987 | Arita et al. | 428/476.9 |
| 4,659,599 | 4/1987 | Strutzel | 428/34.8 |
| 4,668,571 | 5/1987 | Moriarity, Jr. | 428/476.9 |
| 4,686,125 | 8/1987 | Johnston et al. | 428/475.8 |
| 4,687,688 | 8/1987 | Curie et al. | 428/476.1 |
| 4,698,195 | 10/1987 | Okumura et al. | 264/235.8 |
| 4,724,185 | 2/1988 | Shah | 428/339 |
| 4,758,463 | 7/1988 | Vicik et al. | 428/216 |
| 4,800,129 | 1/1989 | Deak | 428/474.4 |
| 4,826,955 | 5/1989 | Akkapeddi et al. | 528/324 |
| 4,908,272 | 3/1990 | Harada et al. | 428/412 |
| 4,952,628 | 8/1990 | Blatz | 525/58 |
| 4,990,562 | 2/1991 | Chou et al. | 525/58 |

FOREIGN PATENT DOCUMENTS

| | | |
|---|---|---|
| 240632 | 11/1986 | European Pat. Off. . |
| 236099 | 2/1987 | European Pat. Off. . |
| 214314 | 3/1987 | European Pat. Off. . |
| 3200428 | 7/1983 | Fed. Rep. of Germany . |
| 006355 | 1/1978 | Japan . |
| 062958 | 5/1980 | Japan . |
| 062959 | 5/1980 | Japan . |
| 101054 | 6/1983 | Japan . |
| 188142 | 8/1986 | Japan . |
| 131060 | 6/1987 | Japan . |

OTHER PUBLICATIONS

"Heat Treatment of Amorphous Nylon to Improve Oxygen Barrier", *Research Disclosure*, p. 418, No. 27904 (Jul., 1987).
CAS Registry No. 25750-23-6, 1 pp. CHEMNAME, File 301.
BYNEL CXA E-162 Coextrudable Adhesive Resins for Multilayer Pkg. 4 pp. Mar. 1985.
Grilon CR9, 8pp., 1986.
Grilon W6220, 3 pp., 1986.
Structure-Property Relationships in Amorphous Polyamides, Polymer vol. 17, pp. 875-892, Oct. 1976.
More News in Packaging Materials, Plastics Technology, vol. 32, No. 2 pp. 5 28, 30, Feb., 1986.
Coextrusion Developments Focus on Barrier Resins, Plastics Technology, vol. 33, No. 13, pp. 5, 77-79, Dec. 1987.
Barrier Polymers, Encyclopedia of Polymer Science and Engineering, 2nd Ed., vol. 2, pp. 176-192 (1985, John Wiley & Sons, Inc.).
Polyamides, Encyclopedia of Polymer Science and Engineering, 2nd Ed., vol. 11, pp. 315-319 (1988, John Wiley & Sons, Inc.).
Polyamides, Plastics, Encyclopedia of Polymer Science and Engineering, 2nd Ed., vol. 11, pp. 445-476 (1988, John Wiley & Sons, Inc.).
Federal Register, vol. 52, No. 136, Jul. 16, 1987 pp. 26666-26667.

*Primary Examiner*—Ana L. Carrillo
*Attorney, Agent, or Firm*—Cedric M. Richeson

[57] ABSTRACT

Orientable single and multilayer thermoplastic flexible films utilizing blends comprising an amorphous nylon copolymer such as nylon 6I/6T and a nylon copolyamide having a melting point of at least about 145° C. having improved processability, shrinkage and optical properties.

12 Claims, No Drawings

AMORPHOUS NYLON COPOLYMER AND COPOLYAMIDE FILMS AND BLENDS

This application is a division of Ser. No. 07/235,258, Aug. 23, 1988 now U.S. Pat. No. 5,053,259.

BACKGROUND OF THE INVENTION

The present invention relates to nylon resin blends, single and multilayer films and casings containing nylon resin blends for use in packaging. In particular, the invention relates to nylon blends, films and casings and/or bags made thereof which are suitable for packaging food products such as fresh meat, processed meat, cheese and sausages.

Nylon is the generic name for a family of polyamide polymers characterized by the presence of the amide group-CONH. The utility of nylon compositions and products are well known with everyday examples including usage in packaging, brushes, and tires, as synthetic films, fibers, plastics and molding resins.

Thermoplastic flexible films are used in a wide variety of applications including bags (e.g. for merchandise, leaves, garbage) wrappings for industrial packaging, in electrical and electronic uses, as communications media substrates, adhesive coated products such as tapes and labels, medical packaging, and food packaging.

In the food industry, thermoplastic flexible films are used to keep food fresh prior to consumption. Greater use of centralized processing of foods in conjunction with increased handling and longer delivery times associated with long distance transportation have increased the demand for packaging films having superior properties.

In the poultry and meat segments of the food industry thermoplastic flexible films are utilized to maintain freshness. Meat is frequently sold fresh, frozen or cooked; therefore films advantageously provide protection at various temperatures. Food items such as primal and subprimal cuts of beef, ground beef and processed meats are known to use coextruded or laminated films which utilize such compositions as nylon, polyester, copolymer of vinylidene chloride (PVDC), ethylene-vinyl acetate copolymer (EVA) and ionomers.

It is also generally known that selection of films for packaging food products includes consideration of such criteria as barrier properties, cost, durability, puncture resistance, flex-crack resistance, FDA approval, machinability, optical properties such as gloss and haze, printability, sealability, shrinkability, shrink force, stiffness, and strength.

In general, nylon films are made by processes which include casting or blown film and these films may be uni-or biaxially oriented. Specific types of nylon such as nylon 6, nylon 6,6, and nylon 12 have been made into films. Known advantages of nylon films relative to other film materials in packaging applications include good oxygen and flavor barrier characteristics, durability at low temperatures and thermal stability. However, nylons in general are costly and are poor moisture barriers. It is known to use certain nylon films as core layers in oriented multilayer films. However, nylon selection is critical and processing is very difficult. These multilayer films may include one or more additional layers of films made of various resins, for example, low density polyethylene (LDPE), ethylene-vinyl acetate copolymer (EVA), ionomer, PVDC, or copolymers of ethylene and methacrylate. Nylon containing films have also been used in vacuum packaging of fresh meat. Typical and generally known films suitable for packaging and information on film manufacture are described in the Encyclopedia of Polymer Science and Engineering 2nd Ed., Vol. 7, pp. 73–127, Vol. 10, pp. 684–695 (John Wiley & Sons, Inc., 1987) whose teachings are hereby incorporated by reference.

Also, amorphous nylons have been disclosed as useful in thermoplastic films including multilayer films and biaxially drawn films.

U.S. Pat. No. 4,698,195 and European Patent application No. 240,632 both disclose a process for preparation of a biaxially drawn polyamide film which utilizes what is termed "a substantially amorphous unoriented polyamide film".

Also, U.S. Pat. No. 4,668,571 (Moriarty, Jr.) discloses a multilayer stock material useful for producing flexible, thermoplastic bags in which an outer layer may comprise a polyamide resin. Among the examples of suitable polyamide resins is listed amorphous nylon.

Additionally, European Patent application No. 236,099 (Fant et al) discloses a multilayer thermoplastic film having optional polyamide layers. Suitable polyamides are said to include a commercially available copolymer of nylon 6 and nylon 12 having a composition of about 60% nylon 6 and about 40% nylon 12 by weight sold under the trademark Grilon CA-6 by Emser Industries. Another suitable nylon copolymer is disclosed as CR-9, having 20% to 30% nylon 6 and 70% to 80% nylon 12 by weight.

Also, more recently coextruded film packaging for processed meat was reportedly being used in Japan which utilizes an amorphous nylon sold under the brand name Novamid X21 by Mitsubishi Chemical Industries Ltd. of Tokyo (See "Coextrusion Developments Focus on Barrier Resins", *Plastics Technology*, Vol. 33, No. 13, pp. 5, 77–79, December, 1987 Bill Communications, Inc., New York).

Oriented nylon films are also well known in the packaging industry for their toughness, puncture resistance, and oxygen barrier properties. In particular, biaxial orientation is known to generally improve film strength. The oxygen barrier properties of oriented nylon films generally provide greater resistance to oxygen permeability as the level of absorbed moisture decreases. As the moisture content increases, the oxygen barrier properties of most oriented nylons deteriorate. When nylon films are to be used or stored under humid or other moist conditions, it becomes desirable to protect the nylon film e.g. by placement between layers having relatively low permeability to moisture, in order to keep the nylon dry. However, orientation of coextruded multilayer blown films having nylon as a protected core layer is difficult due to processing constraints. Often nylon is the outer layer in coextruded processing because of the necessity for rapid quenching to achieve suitable processing in a multilayer structure. Of course, lamination processes may be and are presently utilized to attach a moisture protective layer to nylon, but this is disadvantageously expensive.

In many packaging applications, it is also desirable that at least one of the layers have good heat seal properties. Resins which have both good heat sealability and are substantially impermeable to moisture include various polyethylenes, ethylene copolymers and ionomers. Oriented nylon films are currently used alone and in combination with these heat sealable and moisture resistant layers.

Disadvantageously, it has proved difficult to find film layers (other than PVDC) which have good barrier properties to both moisture vapor and oxygen. Therefore, multilayer films are commonly employed to utilize the most beneficial properties of various film layers.

The *Encyclopedia of Polymer Science and Engineering*, 2nd Edition., Vol. 7, pp. 77-79 (John Wiley & Sons, Inc., 1987) discloses that "nylon is frequently the core portion of the film being coextruded or coated with sealant resins, such as LDPE, EVA, ionomers, or copolymers of ethylene and methacrylate". The nylon layer acts as an oxygen and flavor barrier for such applications as processed meat and cheese packaging, boil-in-bags, and bags for baked goods.

In a typical known process for producing multilayer films containing oriented nylon, the nylon film is oriented by heating to a softened state below the melting point and stretching the softened material. Many conventional nylon resins crystallize very rapidly and have melting points well in excess of adjacent polyethylene layers. Due to these temperature differences and because nylon and polyethylene tend to have different stretching characteristics, the nylon layer is typically oriented separately and in advance of its combination with the adjacent polyethylene layers. The combination of the oriented nylon with the adjacent layers is then accomplished using a conventional but relatively expensive and complex lamination process. This requires an adhesive such as polyurethane type adhesive applied with a coater-laminator.

Another problem with current multilayer oriented nylon structures is that, while a material such as polyethylene generally protects the nylon from moisture, some moisture gradually seeps in from either the packaged food article or the atmosphere and is absorbed by the nylon. This causes an increase in oxygen permeability which shortens the shelf life of oxygen sensitive foods.

Due to recent growth in the market for barrier films, there currently exists an industry wide search for films with improved barrier properties such as low oxygen permeability and low water permeability. For economic reasons, there is also a demand for an oriented nylon multilayer film which can be produced by a coextrusion process. Production of multilayer films by coextrusion is generally more economical than use of lamination methods.

The present invention provides an improved nylon resin blend, and single and multilayer films thereof which ameliorate many problems associated with known films.

It is not necessary that each and every problem listed above be overcome by all embodiments of the invention. It is sufficient that the invention may be advantageously employed when compared to the prior art.

SUMMARY OF THE INVENTION

According to the present invention a novel nylon or polyamide resin blend of an amorphous nylon copolymer and a copolyamide having a melting point of at least 145° C. is disclosed. This newly disclosed blend may be utilized to form novel thermoplastic flexible films of one or more layers. These inventive films are surprisingly easy to process and orient. For example, the blends of the invention form films which are relatively easy to biorient compared to films of the individual blend components alone. In particular, many crystalline nylons exist which are known to be extremely difficult to biaxially stretch in order to form shrinkable films. It has been presently discovered that blends of these orientation-resistant nylons with an amorphous nylon copolymer nylon 6I/6T produces a film which may be easily uniaxially or biaxially oriented. For example, biorientation of a film layer formed of nylon 6/12 alone is very difficult and attempts at biorientation are often unsuccessful. However, a blend of nylon 6/12 with an amorphous nylon may be easily uniaxially or biaxially oriented according to the present invention. Surprisingly, the present invention shows successful biaxial orientation of either single layer film, or coextruded multilayer films having a nylon containing intermediate layer, wherein the nylon layer comprises a blend of a nylon copolyamide having a melting point of at least 145° C. with an amorphous nylon. These films have excellent optical and oxygen barrier properties.

According to the present invention the entire multilayer film is biaxially stretched without the necessity for separately biaxially stretching the nylon containing layer independent from the non-nylon layers followed by lamination of the individual stretched layers.

Unexpectedly, addition of an amorphous polyamide such as nylon 6I/6T having a glass transition point of about 127° C. to a copolyamide such as nylon 6/12 forms a blend which may be easily processed into a shrinkable film. This film exhibits high gloss and low haze and good shrinkage values at temperatures well below 127° C. Addition of amorphous nylon to nonamorphous copolyamides according to the present invention results in great improvements in one or more of such properties as haze, gloss, oxygen permeability, tensile strength, dynamic puncture or shrink percentage after extrusion.

Also, unexpectedly it has been discovered that addition to the above inventive blends of a homopolymer such as nylon 11 having a relatively high $O_2$ permeabiltity value actually lowers $O_2$ permeability of the resulting film. Advantageously, blends of the present invention may be employed to form uniaxially or biaxially oriented single or multilayer films by a variety of orientation processes.

DETAILED DESCRIPTION OF THE INVENTION

Polyamides include nylon resins which are well known polymers having a multitude of uses including utility as packaging films, bags and casing. See, e.g. *Modern Plastics Encyclopedia*, 88 Vol. 64, No. 10A, pp 34-37 and 554-555 (McGraw-Hill, Inc., 1987) which is hereby incorporated by reference. In particular, the novel blends, thermoplastic flexible films, and oriented multilayer films of the present invention are useful in food packaging.

The invention utilizes an amorphous nylon copolymer as a component of a novel resin blend used to produce novel single and multilayer films. The term "amorphous" as used herein denotes an absence of a regular three-dimensional arrangement of molecules or subunits of molecules extending over distances which are large relative to atomic dimensions. However, regularity of structure may exist on a local scale. See, "Amorphous Polymers," Encyclopedia of Polymer Science and Engineering, 2nd Ed., pp. 789-842 (J. Wiley & Sons, Inc. 1985). In particular, the term "amorphous nylon copolymer" as used with respect to the present invention refers to a material recognized by one skilled in the art of differential scanning calorimetry (DSC) as having no measurable melting point (less than 0.5 cal/g) or no heat of fusion as measured by DSC using ASTM 3417-83.

Suitable amorphous nylon copolymers include hexamethyleneisophthalamide-hexamethylene terephthalamide copolymer also referred to as nylon 6I/6T. A preferred component of the invention is hexamethyleneisothalamide-hexamethylene terephathalamide copolymer which has from about 65 percent to about 80 percent of its polymer units derived from hexamethyleneisophthalamide. Especially preferred as the amorphous nylon copolymer component is a commercially available nylon 6I/6T sold by the DuPont Company of Wilmington, Del., U.S.A. under the trademarked designation Selar PA 3426.

Selar PA 3426 is further characterized by DuPont Company technical bulletin E-73974 dated 12/85, which is hereby incorporated by reference, as an amorphous nylon (polyamide) having superior transparency, good barrier properties to gases such as $O_2$, solvents and essential oils and also the following properties according to the indicated standards: density of 1.19 gm/cc (ASTM D1505); glass transition temperature of 127° C. (ASTM D3418); heat deflection temperature of 126° C. at 4.6 Kg/cm$^2$ (66 psi) and 123° C. at 18.4 Kg/cm$^2$ (264 psi) (ASTM D648); and flexural modulus of 27,900 Kg/cm$^2$ (400,000 psi) at 50 percent relative humidity and 23° C. (ASTM D790).

The amorphous nylon copolymer used in the present invention may be manufactured by the condensation of hexamethylenediamine, terephthalic acid, and isophthalic acid according to known processes. It is preferred that a nylon 6I/6T resin be used which is manufactured such that 65 to 80 percent of the polymer units are derived from hexamethylene isophthalamide. Advantageously, such resins (which are further characterized as having a specific gravity of 1.207±0.1, no melting point, and having the solubility and extraction values listed in Table I) have been approved for food contact in the United States by the Food and Drug Administration. (See 52 Fed. Reg. 26,666-26,667, Jul. 16, 1987, the disclosures of which are hereby incorporated by reference).

TABLE 1

| Nylon resin | Solubility in boiling 4,2N HCl | Maximum extractable fraction as selected solvents (% by weight of resin) | | | |
|---|---|---|---|---|---|
| | | WATER | 95% Ethyl Alcohol | Ethyl Acetate | Benzene |
| Nylon 6I/6T | Insoluble after 1 hour | 0.2 | 1.0 | 0.1 | 0.1 |

Suitable copolyamides useful in forming the blends and films of the present invention are copolyamides having a melting point of at least 145° C. A suitable method of determining a melting point is by using differential scanning calorimetry as above to determine the heat of fusion. Preferred copolyamides melt at temperatures within a range of from about 145° C. to about 215° C. Copolyamides with melting points in this range have been found to form useful blends with the above noted amorphous nylon copolymers, which blends are easy to process into films including oriented films. In film packaging applications, copolyamides with melting points less than 145° C. soften and distort at typical processing temperatures which include e.g. 82°-93° C. (180°-200° F.) for shrink wrapping and 71°-82° C. (160°-180° F.) for cooking sausages. Copolyamides especially suited as components of the inventive films and blends are copolyamides which comprise a copolymer of nylon 6 with at least one other polyamide whereby the copolyamide has a melting point of at least about 145° C. Preferably, these especially suited copolyamides have a melting point less than about 215° C. Mixtures of copolyamides are also contemplated.

Preferred copolyamides are nylon 6/12 and nylon 6/66 and mixtures thereof. Nylon 6/12 and nylon 6/66 copolyamides are commercially available. For example a nylon 6/12 copolyamide which melts within a range of from about 195°-200° C. (ASTM D2117) is commercially available under the trademark Grilon CR 9 from Emser Industries of Sumter, S.C., a division of EMS-American Grilon, Inc. (EMS).

Mixtures of copolyamides may be usefully employed in the present invention. For example, two or more copolyamides each having a melting point of at least 145° C. may be used, or a copolyamide having a melting point of at least 145° C. may be mixed with one or more other copolyamides which have melting points less than 145° C. or are amorphous themselves. A suitable copolyamide for mixing which has a melting point less than 145° C. is another nylon 6/12 copolyamide which melts at about 134° C. (DSC max.) which is commercially available from EMS under the trademark Grilon W6220. In an especially preferred embodiment of the invention, mixtures of these two nylon 6/12 copolyamides are utilized. A copolyamide of nylon 6/66 which melts at about 195° C. is commercially available from Allied-Signal under the trademark Nylon 1539, mixtures of one or more nylon 6/12 copolyamides with one or more nylon 6/66 copolyamides may be usefully employed in the invention. Also, mixtures of various nylon 6/12 compositions may be employed to optimize properties. Advantageously, a most preferred nylon 6/12 copolyamide mixture may be formed from about 80 percent by weight of Grilon CR9 and 20 percent by weight of Grilon W6220.

In addition to the first component of an amorphous nylon copolymer and the second component of a copolyamide having a melting point of at least 145° C., the blends and/or films of the present invention may also employ as a third component a polyamide homopolymer. It has been found that a nylon homopolymer may be added to decrease gas permeability and thereby improve the gas barrier properties of the blend. Suitable homopolymers include such commercially available nylons as nylon 6, nylon 11 and nylon 12.

According to the present invention, a nylon resin blend is provided comprising, as a first component of the the blend, an amorphous nylon copolymer and, as a second component, a polyamide having a melting point of at least 145° C. The first component is preferably nylon 6I/6T which is an amorphous hexamethyleneisophthalamide-hexamethyleneterephthalamide copolymer. Advantageously, a nylon 6I/6T having from about 65 to about 80 percent of its polymer units derived from hexamethyleneisophthalamide will be employed with a commercially available composition sold under the brand name Selar PA 3426 by the Dupont Company of Wilmington, Del. being especially preferred. The second component is preferably a nylon 6/12 alone or a mixture of nylon 6/12's. Advantageously, a mixture of (i) a nylon 6/12 having a melting point between about 145° C. and 215° C. with (ii) a nylon 6/12 having a melting point of less than about 145° C. is employed. Especially preferred is a mixture of about 80% by weight of a nylon 6/12 known as Grilon CR9 and about 20% by weight of a nylon 6/12 known as Grilon W6220, both nylon 6/12 copolyamides being sold by Emser Industries of Sumter, S.C.

Optionally, a third component may be advantageously employed. As noted above, a homopolymer such as nylon 6, nylon 11, or nylon 12 may be added as a third component to the blend. Surprisingly, addition of a preferred homopolymer such as nylon 11 increases the barrier properties of the films of the blend to transmission of oxygen gas. A fourth component or more such as other nylon copolymers (e.g. nylon 6/66), or other amorphous nylons may also be added to the blend.

Unless otherwise specified, all weight percentages herein are based upon the total weight of the resin blend.

Advantageously, the first component (amorphous nylon copolymer) will be present in an amount of from about 10 to about 70 weight percent. Use of amounts less than 10 wt. % reduces the beneficial effect of enhanced properties attributable to the amorphous nylon copolymer component. In particular, the haze of films increases noticeably at lower amounts. Also, use of amounts greater than 70 wt. %, has a deleterious effect on processability, particularly with respect to producing biaxially oriented single layer films. Bubble formation becomes increasingly difficult at high levels of amorphous nylon copolymer. Beneficially, the second component (copolyamide) will be present in the blend in an amount of from about 10 to about 90 weight percent relative to the total weight of the blend. At amounts less than 10 percent and greater than 90 percent, orientation of a film of the blend becomes increasingly difficult, particularly for simultaneous biaxial orientation during a double bubble type process. Also, use of amounts in excess of 90 percent reduces the beneficial optical properties of the blend, e.g. haze increases noticably. Optionally, a beneficial third component (homopolymer) may be present in the blend in an amount of from 10 to about 30 weight percent. At amounts under 10 percent the beneficial effect on physical properties such as oxygen barrier properties decreases. Disadvantagely, amounts over 30 present increases stiffness to undesirable levels for film processing. The above range of amounts and particular components and combinations are believed to provide enhanced processing and-/or resin properties, and films made from such resins show unexpected and surprising properties and results as described below.

The present invention contemplates blown films as well as uniaxially or biaxially oriented films of one or more layers. These thermoplastic flexible films may be made by well known conventional processes.

In multilayer film applications of the present inventions, the first outer layer and second outer layer and additional optional intermediate layers may be made of any suitable resins or resin blends. Nonlimiting examples of suitable resins include polyolefin resins such as polypropylene, low density polyethylene (LDPE), linear low density polyethylene (LLDPE), very low density polyethylene (VLDPE), and copolymers and/or blends thereof including e.g. ethylene vinyl acetate copolymer (EVA). Other examples of suitable resins include polyesters, other nylons, ionomers, poly (vinylidene chloride) copolymers (PVDC), ethylene vinyl alcohol copolymers (EVOH), and various blends thereof.

Preferred components of the outer layers are LLDPE, VLDPE, EVA and blends thereof. Linear low density polyethylene (LLDPE) refers to copolymers of ethylene with one or more comonomers selected from preferably $C_4$ to $C_{10}$ alpha-olefins such as butene-1, octene, in which long chains of copolymer are formed with relatively few side chain branches or crosslinking. The degree of branching is less than that found in typical conventional low or medium density polyethylene. LLDPE may also be characterized by the known low pressure, low temperature processes used for their production. LLDPE is known to have a density between about 0.91 and 0.93 grams per cubic centimeter and a melting point of approximately 120° C. VLDPE is a copolymer of ethylene and at least one comonomer selected from $C_4$ to $C_{10}$ alpha-olefins and having a density between about 0.86 and 0.91 g/cc and a melting point of about 120° C. EVA is a copolymer of ethylene and vinyl acetate. Preferred EVA resins will comprise between about 1 to 20 percent vinyl acetate by weight and most preferably 3 to 12 percent by weight. Advantageously, EVA may be blended with LLDPE or VLDPE.

Also, adhesives may be blended in the layers or adhesive layers may be laminated, coated or coextruded. Suitable adhesive resins include anhydride based EVA and LLDPE resins. A preferred adhesive resin is an ethylene based polymer containing vinyl acetate and anhydride functionality such as that sold by DuPont Company under the brand name Bynel CXA E-162.

For the blends, single and multilayer films of the present invention the resins utilized are generally commercially available in pellet form and as generally recognized in the art, may be blended by well known methods using commercially available blenders.

Also, if desired, well known additives such as processing aids, slip agents, antiblocking agents, pigments, and mixtures thereof may be incorporated into the film, generally in small amounts of up to about 10 percent by weight by blending prior to extrusion.

The resins and any additives are introduced to an extruder (generally one extruder per layer) where the resins are melt plastified by heating and then transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other process parameters chosen. In coextrusion, barrel and die temperatures, for example, may range between about 175° C. and 250° C. However, depending upon the manufacturing process used and particular equipment and other process parameters utilized, variations and actual process parameters including process temperatures will be set by one skilled in the art without undue experimentation.

In a preferred coextrusion type of double bubble process as described in U.S. Pat. No. 3,456,044 the primary tube leaving the die is inflated by admission of air, cooled, collapsed, and then preferably oriented by reinflating to form a secondary bubble with reheating to the film's orientation (draw) temperature range. Machine direction (M.D.) orientation is produced by pulling e.g. by utilizing a pair of rollers travelling at different speeds and transverse direction (T.D.) orientation is obtained by radial bubble expansion. The oriented film is set by cooling. Suitable machine direction and transverse direction stretch ratios are from about 1.5:1 to about 3.5:1 with a ratio of about 2.5:1 preferred.

Oriented single layer films may also be made by the above process e.g. by extruding only a single layer or delamination. The orientation of single or multilayer films may improve certain physical properties of the films as well as create films which are heat shrinkable. Also, the film may be stretched in the M.D. direction only, or stretched sequentially (M.D. first followed by T.D. expansion) or simultaneously stretched in machine and transverse directions.

Experimental results of the following examples are based on tests similar to the following test methods unless noted otherwise.

Haze: ASTM D-1003-52
Gloss: ASTM D-2457, 45° Angle
Tensile Strength: ASTM D-882, method A
% Elongation: ASTM D-882, method A
1% Secant Modulus: ASTM D-882, method A
$O_2$ Transmission: ASTM D-3985-81
Elmendorf Tear Strength: ASTM D-1922
Gauge: ASTM D-2103

Shrinkage Values: Shrinkage value is defined to be values obtained by measuring unrestrained shrink at 90° C. for five seconds. Four test specimens are cut from a given sample of the film to be tested. The specimens are cut to 10 cm. in the machine direction by 10 cm. in the transverse direction. Each specimen is completely immersed for 5 seconds in a 90° C. water bath. The distance between the ends of the shrunken specimen is measured. The difference in the measured distance for the shrunken specimen and the original 10 cm. is multiplied by ten to obtain the percent of shrinkage for the specimen. The shrinkage for the four specimens is averaged for the MD shrinkage value of the given film sample, and the shrinkage for the four specimens is averaged for the TD shrinkage value.

Dynamic Puncture Resistance: Dynamic Puncture Resistance values are defined to be those obtained by the following test. The dynamic puncture-impact test procedure is used to compare films for their resistance to bone puncture. It measures the energy required to puncture a test sample with a sharp pyramidal metal point made to simulate a sharp bone end. A Dynamic Ball Burst Tester, Model No. 13-8, available from Testing Machines. Inc., Amityville, Long Island, N.Y., is used, and a modified tip is installed on the tester probe arm for use in this test procedure. The modified tip is constructed from a ⅜ inch diameter conical tip having a configuration of a right circular cone with the angle between the cone axis and an element of the conical surface at the vertex being about 65°. Three equally spaced and abutting planar surfaces are machined to a smooth finish on the cone surface to form a pyramidal shaped point. Six test specimens approximately 4 inches square are prepared, a sample is placed in the sample holder, and the pendulum is released. The puncture energy reading is recorded. The test is repeated until 6 samples have been evaluated. The results are calculated in cm-kg per mil of film thickness and are averaged.

The following are examples and comparative examples given to illustrate the present invention.

In all the following examples, unless otherwise indicated herein the film compositions were produced generally utilizing the apparatus and method described in U.S. Pat. No. 3,456,044 (Pahlke) which describes a coextrusion type of double bubble method and in further accordance with the detailed description above. All percentages are by weight unless indicated otherwise.

EXAMPLES 1-2 AND COMPARATIVE EXAMPLES 3-4

The film compositions of Examples 1-4 were produced under similar conditions. For each example listed in Table 2 the components were blended in the indicated weight ratio followed by heat plastification and extrusion of a tube as generally described above and in the procedure for making a single layer film as described in examples 7-13. Draw point temperature and bubble cooling rates were adjusted to maximize bubble stability, and properties of each film are reported in Table 2. Examples 3 and 4 are comparative examples (not of the invention) whereas examples 1 and 2 are of the present invention.

The films were extruded in the form of a seamless tube. The tubes were wound on cardboard reels and the end of each tube was secured by tape. Examples 1 and 2 represent identical films except that in the film of Example 2 the reeled tube was then annealed in a circulating hot air oven at 100° F. to dimensionally stabilize the tube. During annealing, the tube flat width was reduced from about 6.25 inches to about 5 inches by shrinkage.

Properties of an unannealed and annealed film of the present invention are reported in Examples 1 and 2 respectively. The amorphous nylon copolymer and copolyamide blend of Examples 1 and 2 formed a shrinkable film which was easy to orient with unexpectedly good optical properties including very high gloss and low haze relative to comparative examples 3 and 4 which did not contain an amorphous nylon copolymer. The unannealed film of example 1 had very high shrinkage relative to the unannealed comparative examples 3 and 4 (not of the invention). Annealing reduces the shrinkage as seen in example 2.

Also, the examples 1 and 2 of the invention demonstrated higher tensile strength relative to the comparative examples 3 and 4 (not of the invention).

A comparison of haze, gloss and tensile strength properties of the unannealed film of Example 1 with the annealed film of Example 2 indicates that annealing may modify or improve some properties relative to unannealed film. Moreover, both films (annealed and unannealed) of the present invention have improved tensile strength, superior gloss, and dramatically less haze than the unannealed comparative films. In each example and comparative example the amount of component A was held the same and component B was varied by substituting two different crystalline 6/12 polyamides for the amorphous polyamide of the present invention.

An annealed tube according to Example 2 of the present invention was used as a sausage casing. This tube was hand stuffed with a beef and pork emulsion, and cooked. The resultant sausage casing had a good yield with uniform adhesion of the casing to the stuffed meat.

TABLE 2

| # | Nylon Blend Components A | B | A:B Wt. Ratio | Haze % | Gloss | Tensile Strength × 10³ (psi) M.D./T.D. | Shrink % at 90° C. M.D./T.D. |
|---|---|---|---|---|---|---|---|
| 1+ | 6/12 (CR9) | amorphous nylon copolymer* | 4:1 | 2.1 | 93.1 | 23/23 | 51/49 |
| 2++ | 6/12 (CR9) | amorphous nylon copolymer* | 4:1 | 1.8 | 97.8 | 20/24 | 14/9 |
| 3 | 12 (CR9) | 6/12 (CA6) | 4:1 | >30 | 13.3 | 15/15 | 19/22 |
| 4 | 12 (CR9) | 6/12 (W6220) | 4:1 | >30 | 5.0 | 15/17 | 15/18 |

*A nylon 6I/6T amorphous copolymer sold under the brand name Selar PA 3426 was used.
+Unannealed film
++Annealed film

EXAMPLE 5 AND COMPARATIVE EXAMPLE 6

In Example 5 an amorphous nylon copolymer (nylon 6I/6T in the form of Selar PA 3426) was added to the resin blend of comparative example 6 (not of the invention). The blend of the invention (example 5) and the comparative blend (example 6) were both processed under similar conditions into single layer films, (See the description for examples 7-12 below) and similarly tested for tensile strength, tear strength, dynamic puncture resistance and shrinkage values. The test results as shown in Table 3 clearly demonstrate that addition of an amorphous nylon copolymer such as 6I/6T to the substantially crystalline blend prior to processing produced a film with greatly increased tear strength and puncture resistance. Tensile strength also showed improvement and shrinkage values were significantly higher.

The film of example 5 was used as a tubular seamless casing by first annealing the tube at 100° F. as for Example 2 with a resultant reduction in flat width from about 6.25 inches to about 5.37 inches. Then the annealed tubular casing was hand stuffed with a meat emulsion and steam cooked at 170° F. until the internal temperature reached 150° F. The resultant cooked, stuffed sausage had uniform adherence of the casing to the sausage over the entire surface and at least as good of an appearance and cooking weight yield as a similarly made sausage having a commercially available nylon casing.

films described in Examples 7-13. Blends of an amorphous nylon copolymer such as nylon 6I/6T and a crystalline copolyamide having a melting point above 145° C. such as a commercially available nylon 6/12 (Grilon CR9) may be made with one or more other nylon 6/12 copolymers, nylon 6/66 copolymers or nylon homopolymers such as nylon 6, nylon 11, and nylon 12.

Each single layer film was extruded and biaxially stretched (oriented) by a known double bubble extrusion process (See e.g. U.S. Pat. No. 3,456,044). In forming the primary film tube, the resins were conventionally blended and heat plastified in a conventional single screw extruder equipped with a standard commercially available polyethylene screw and conventional die similar to the procedure described for examples 12-21. The extruder barrel temperature ranged from 350° F. to about 450° F. and the die temperature was set at about 435° F. The machine direction (M.D.) orientation ratio was from about 2 to 2.5 and the transverse direction (T.D.) orientation ratio was from about 2 to 3. In order to minimize equipment changes during experimental runs and provide physical support and reduce adhesion to equipment each single layer film was formed by coextrusion of the nylon containing layer with a polyethylene layer such as linear low density polyethylene to form a primary tube. The polyethylene outer layer was then stripped off after cooling of the primary tube but prior to biaxial orientation to yield a single layer film. It is expected that single layer films may be conventionally formed by one of ordinary skill in the art without need for coextrusion of a second layer.

TABLE 3

| # | Nylon Blend Components nylon* 66 wt. % | nylon** 6/12 wt. % | nylon*** 6I/6T wt. % | Tensile Strength × 10³ (psi) M.D./T.D. | Elmendorf Tear Strength (gm/mil) M.D./T.D. | Dynamic Puncture Resistance (cm-Kg/mil) | Shrink % at 90° C. M.D./T.D. |
|---|---|---|---|---|---|---|---|
| 5 | 72 | 18 | 10 | 27/21 | 49/76 | 2.3 | 35/32 |
| 6 | 75 | 25 | — | 22/24 | 15/16 | 1.6 | 22/25 |

*The nylon 6/66 used was commercially available under the brand name Nylon 1539 from Allied-Signal Engineered Plastics of Morristown, New Jersey and had a melting point of about 195° C.
**The nylon 6/12 used was commercially available under the brand name Grilon W6220 from Emser Industries of Sumter, South Carolina and had a melting point of about 135° C.
***The amorphous nylon copolymer used was a nylon 6I/6T which was commercially available under the brand name Selar PA 3426 from the DuPont Company of Wilmington, Delaware and had a glass transition point of about 127° C.

EXAMPLE 7-13

Biooriented films of three and four component blends may be made according to the present invention as demonstrated by the compositions and properties of the Single layer films having various nylon blend components are listed in Table 4 as Examples 7-13. In all of these examples the blends produced biooriented films having good shrink properties in both the machine direction and the transverse direction. In examples 9 and 11, shrinkage was determined to be comparable to the other examples in Table 4, however, shrinkage measurements were made of the fresh film soon after orientation whereas measurements of examples 7, 8, 10, 12 and 13 were made several days following orientation.

The optional addition of nylon homopolymers may improve gas barrier properties by lowering permeability. In examples 11 and 13, the nylon 6 and nylon 12 polymers, were commercially available nylon homopolymers sold under the respective brand names Emser F40 (nylon 6) and Emser L25 (nylon 12) by Emser Industries of Sumter, S.C. In example 12, the nylon 11 polymer was a nylon homopolymer commercially available under the trade name Rilsan Besno nylon 11 from Rilsan Corporation of Glen Rock, N.J. Surprisingly, as shown in example 12, addition of nylon 11 which has a relatively high $O_2$ permeability (28 cc mil/24 hrs/100 in$^2$/1 atm) yielded a film with a lower oxygen permeability (relative to examples 7 and 8 which did not contain a homopolymer such as nylon 11).

ture set at about 435° F. The machine direction orientation ratio was from about 3:1 to 5:1 and transverse direction orientation ratio was from 3:1 to 5:1. The resins of examples 14–24 were coextruded and bioriented according to known methods as outlined above and the resultant oriented films tested.

Examples 16, 19–23 are three layer films in which both outer layers of each film comprise a copolymer of ethylene with vinyl acetate (EVA). Each outer layer was blended with 10% by weight (relative to the weight of the outer layer) of an adhesive resin,(Bynel 162-E). This adhesive was also blended in like amount with the very low density polyethylene (VLDPE) which comprised both outer layers of examples 18 and 24 as well as the second outer layer of example 17. The first outer layer of example 17 was an EVA blended with an adhesive similar to the other EVA layers in this group of examples.

Both outer layers of comparative example 14 comprised a linear low density polyethylene (LLDPE), whereas both outer layers of comparative example 15 comprised VLDPE. Comparative example 15 suffered from delamination and both outer layers were removed

TABLE 4

| # | Amorphous Nylon* wt. % | Nylon 6/12** m.p. > 145° C. wt. % | Nylon 6/12*** wt. % | Other Nylon | wt. % | SHRINK % at 90° C. M.D./T.D. | $O_2$ TRANS. cc mil/ 100 in$^2$/ 24 hr/1 atm |
|---|---|---|---|---|---|---|---|
| 7 | 10 | 72 | 18 | | | 32/26 | 5.45 |
| 8 | 20 | 72 | 8 | | | 48/46 | 4.79 |
| 9 | 18 | 57.6 | 14.4 | nylon 6/66+ | 10 | N.D. | N.D. |
| 10 | 18 | 57.6 | 14.4 | nylon 6/12++ | 10 | 40/43 | 2.33 |
| 11 | 18 | 57.6 | 14.4 | nylon 6+++ | 10 | N.D. | N.D. |
| 12 | 18 | 57.6 | 14.4 | nylon 11++++ | 10 | 35/38 | 1.46 |
| 13 | 18 | 57.6 | 14.4 | nylon 12+++++ | 10 | 38/38 | 1.76 |

N.D. — Not Determined
*An amorphous nylon 6I/6T copolymer commercially available as Selar PA 3426 (trademark of E. I. DuPont de Nemours & Co.).
**A nylon copolyamide of nylon 6/12 commercially available as Grilon CR9 (trademark of Emser Industries).
***A nylon copolyamide of nylon 6/12 commercially available as Grilon W622O (trademark of Emser Industries).
+Nylon 1539 (trademark of Allied-Signal Engineered Plastics).
++Zytel 151 (trademark of E. I. DuPont de Neumours & Co.).
+++Emser F40 (trademark of Emser Industries).
++++Rilsan Besno (trademark of Rilsan Corporation).
+++++Emser L25 (trademark of Emser Industries).

EXAMPLES 14–24

A series of multilayer films according to the present invention were made by the above described coextrusion type of double bubble process with a nylon blend intermediate layer. The physical properties of these multilayer films and two comparative examples were tested and the results are listed as examples 14–24 in Table 5. Comparative examples 14 and 15 are not of the present invention whereas the remaining examples are of the present invention.

Each multilayer film was coextruded and biaxially oriented by known coextrusion and orientation processes (see e.g. U.S. Pat. No. 3,456,044). For the three layer films of examples 16–24 a layer thickness ratio of 12:7:6 was used which corresponds to first outer layer; intermediate layer: second outer layer, respectively. The layer ratio of example 14 was 2:1:2. In forming the blown film tube, the first outer layer, corresponds to the outermost layer of the tube and the second outer layer corresponds to the innermost layer of the tube. Three single screw extruders equipped with polyethylene metering screws were utilized with the extruders attached to a conventional coextrusion die. The die diameter was 1.25 inches. The extruder barrel temperature ranged from about 350° to about 450° F. with the die temperaafter orientation. Therefore, the test results for example 15 are for the intermediate layer of nylon 6/12 copolymer alone.

Examples 14–24 were tested for tensile strength, ultimate elongation, secant modulus at 1%, shrinkability at 90° C., dynamic puncture resistance, haze, gloss and oxygen gas transmission. The results of these tests are listed in tabular form in Table 5 along with the average gauge of the test sample, and composition of the films.

Example 14 (not of the invention) contained a 100% amorphous nylon intermediate layer. It did not contain any copolyamide having a melting point greater than 145° C. as required by the present invention. The film of example 14 was difficult to process and orient relative to films of the instant invention. Also, the biaxially oriented film of comparative example 14 has a very low shrinkage value (less than 5%). Also, the film of example 14 has comparatively low gloss and high haze. However, the film of example 14 does have excellent oxygen barrier properties and tensile strength. This film is the subject of a U.S. patent application Ser. No. 091,172, the disclosure of which is hereby incorporated by reference in its entirety.

Comparative example 15 (not of the invention) contained an intermediate layer having 100% by weight of a copolyamide having a melting point greater than 145° C. The test results are of the intermediate layer alone, but do not indicate or suggest the surprisingly good physical properties of the present invention as shown in Table 5 and discussed below.

The results shown in Table 5 demonstrate that biaxially oriented coextruded multilayer films having a novel nylon blend as an intermediate layer can be successfully made with useful properties and that the properties of these films can be adjusted either by changing the composition of the nylon blend or by varying the type of layer to which the nylon layer is attached.

TABLE 5

| # | NYLON BLEND INTERMEDIATE LAYER | | | FIRST OUTER LAYER+ | SECOND OUTER LAYER+ | AVG. GAUGE (mil) | TENSILE STRENGTH $\times 10^3$ (psi) M.D./T.D. | ELONG. % M.D./T.D. |
|---|---|---|---|---|---|---|---|---|
| | A++ wt. % | B+++ wt. % | C++++ wt. % | | | | | |
| 14 | 100 | 0 | 0 | LLDPE | LLDPE | 2.7 | 27/27 | 78/26 |
| 15* | 0 | 100 | 0 | VLDPE | VLDPE | .5 | 21/27 | 42/76 |
| 16 | 20 | 72 | 8 | EVA | EVA | 2.4 | 7.1/9.6 | 182/210 |
| 17 | 20 | 72 | 8 | EVA | EVA | 2.9 | 9.7/7.9 | 240/416 |
| 18 | 20 | 72 | 8 | VLDPE | VLDPE | 3.6 | 7.9/9.8 | 251/247 |
| 19 | 20 | 64 | 16 | EVA | EVA | 2.3 | 11.5/9.6 | 158/247 |
| 20 | 30 | 56 | 14 | EVA | EVA | 2.7 | 12.5/9.5 | 141/254 |
| 21 | 40 | 48 | 12 | EVA | EVA | 2.3 | 9.3/9.5 | 91/152 |
| 22 | 50 | 40 | 10 | EVA | EVA | 2.1 | 10.2/8.4 | 91/124 |
| 23 | 70 | 24 | 6 | EVA | EVA | 2.3 | 8.6/5.4 | 70/70 |
| 24 | 50 | 40 | 10 | VLDPE | VLDPE | 1.4 | 9.8/9.3 | 113/175 |

| # | SECANT MODULUS at 1% $\times 10^3$ (psi) M.D./T.D. | SHRINK AT 90° C. % M.D./T.D. | DYN. PUNC. (CmKg/mil) | HAZE % | GLOSS | $O_2$ TRANS. (cc mil/ 100 in$^2$/ 24 hr/atm) |
|---|---|---|---|---|---|---|
| 14 | 80/111 | 3/2 | <.5 | >30 | 18 | 6.8 |
| 15* | N.D. | 27/34 | <.5 | 10 | 39 | N.D. |
| 16 | 27/14 | 37/35 | 2.4 | 3 | 74 | 13.44 |
| 17 | 11/39 | 32/27 | 2.5 | 15 | 40 | 19.0 |
| 18 | 22/19 | 30/22 | 3.0 | 25 | 28 | 20.0 |
| 19 | 24/22 | 47/44 | 3.6 | 3 | 78 | 20.2 |
| 20 | 25/23 | 49/41 | 3.2 | 3 | 79 | 12.8 |
| 21 | 28/32 | 40/43 | 3.4 | 4 | 74 | 11.3 |
| 22 | 41/33 | 23/24 | 2.7 | 6 | 70 | 9.9 |
| 23 | 95/58 | 26/19 | 2.5 | 6 | 67 | 7.5 |
| 24 | 37/72 | 16/25 | 3.1 | 28 | 24 | 10.0 |

N.D. = Not Determined
+Outer layers of examples 16-24 included 10% by weight of Bynel 162-E (trademark of E. I. DuPont deNemours & Co., Wilmington, DE) which is a commercially available ethylene based polymer adhesive resin containing vinyl acetate and anhydride functionality.
++Amorphous nylon copolymer-nylon 6I/6T (sold under trademark Selar PA 3426 by DuPont).
+++Nylon 6/12 copolyamide having m.p. > 145° C. (sold under trademark Grilon CR9 by Emser Industries, Sumter, SC).
++++Nylon 6/12 copolyamide having m.p. < 145° C. (sold under trademark Grilon W6220 by Emser Industries, Sumter, SC).
*Test results are for the nylon intermediate layer only. The outer layers of VLDPE were removed prior to testing.

Examples 16-24 of the present invention demonstrate that biaxially oriented multilayer films having a nylon blend intermediate layer with multilayer film shrinkage values of 5% or greater may be made according to the present invention. Advantageously, multilayer films with shrinkage values of 20% or higher in one or more directions may be produced with shrinkage value greater than 40% obtainable for various film compositions.

All of the examples of the invention having both outer layers of EVA show excellent optical properties with very high gloss and very low haze. Increasing the proportion of the amorphous nylon in the blend, as seen in examples 19-23, exhibits a corresponding increase in 1% secant modulus values and a corresponding decrease in ultimate elongation percentages and transmission of oxygen across the film.

A comparison of inventive examples 16-24 shows that shrinkability of the films may be adjusted either by variation of the amount of amorphous nylon is the blend or by changing the composition of one or more of the added layers. All the films of the present invention exhibit good tensile strength and relatively good oxygen barrier properties for nylon films.

Although one and three layer film embodiments of the present invention have been described above, these examples are merely illustrative and two layer as well as four or more layer films are contemplated. These multilayer films may be formed by any method known in the art including both coextrusion and lamination processes as well as combined coextrusion and lamination. In particular, it will be appreciated by one of skill in the art in view of the present disclosure that additional intermediate layers may be provided as desired to achieve additional beneficial or optimum properties or meet performance requirements. These additional intermediate layers need not contain nylon. For example, adhesive layers may be provided or other layers added which provide improved puncture resistance, strength, shrink force, or additional barrier properties. Similarly, outer layers may be formed of a variety of resins or blends e.g. to enhance heat sealability, printability, puncture resistance, or to provide additional barrier properties.

Beneficially, in food packaging applications such as for meat or poultry, a thermoplastic film or film layer comprising an amorphous nylon copolymer and copolyamide blend according to the present invention will preferably range in thickness from about 0.3 to about 1.5 mils. Thinner and thicker films, while still of the invention, become weaker or more costly, respectively. Generally, in these food packaging applications, multilayer films having sufficient desired properties including strength will be in the range of 1.5 to 3.5 mils.

In a preferred multilayer food packaging embodiment, the multilayer film structure utilizes an intermediate layer containing an amorphous nylon copolymer and copolyamide blend which acts as an oxygen barrier layer and comprises about 20 to about 30 percent of the total thickness of the multilayer film. The outer layer adapted for placement adjacent to a food product is generally about 45 to about 55 percent of the total thickness and the opposing outer layer is typically 20 to 35 percent. Generally, in poultry and meat food packaging applications, the outer layer closest to the packaged product must have sufficient thickness to ensure heat sealing integrity; the intermediate barrier layer must be sufficiently thick to provide its gas barrier properties at desired levels; and the outer layer adapted for placement opposite the packaged products must have sufficient thickness to withstand handling and other external forces. However, it is contemplated that those of ordinary skill in the art will readily vary layer and film thicknesses according to particular packaging requirements. Generally, in commercial packaging for cook-in and processed meat applications, films (including multilayer films) desirably have an oxygen permeability value of less than about 4.5 cc/100 in.$^2$ in 24 hours at 1 atmosphere as measured by ASTM 0-3985-81 in order to protect mean from deterioration due to exposure to oxygen.

It is further believed that properties such as high temperature puncture resistance of the inventive single and multilayer films, may be improved by irradiation and/or crosslinking according to known methods. Preferably, the entire film is irradiated after orientation. Alternatively, one or more single layers may be oriented and irradiated and optionally formed into a multilayer film by lamination processes with other irradiated or nonirradiated layers. A suitable irradiation dosage is irradiation up to 10 Mrad with irradiation from 1 to 5 Mrad preferred. Known irradiation procedures may be utilized. Various procedures are described in U.S. Pat. No. 4,044,187.

The multilayer film of this invention is preferably produced by a coextrusion type of double bubble method. The extruder screws and dies used in the examples were standard polyethylene screws and 1¼ " dies. These screws and dies were suitable to make films of the present invention. However special screws for use with polyamide (nylon) resins are commercially available and may provide enhanced performance as may other commercially available dies. The multilayer film may also be fabricated by extrusion coating, wherein a base tube is extruded and succeeding layers are surface coated on the base tube in a manner such as that disclosed in U.S. Pat. No. 3,741,253. Also, single or multilayer films may be slot cast and uniaxially or biaxially stretched by tentering. Still further, the inventive multilayer film may be fabricated by producing separate film layers and then laminating the layers together or by a lamination biaxial orientation type of double bubble method.

The multilayer film of the invention may be wound up as flattened, seamless, tubular film to be used later to make bags. Bags having end seals are typically made by transverse heat sealing across the width of flattened tubing followed by severing the tubing so that the transverse seal forms the bag bottom. Alternatively, side-seal bags may be formed in which the transverse seals form the bag sides and one edge of the tubing forms the bag bottom.

Various conventional additives such as processing aids slip agents, anti-block agents, plasticizers and pigments can be incorporated into single and multilayer films of this invention, as is well-known in the art.

The above examples serve only to illustrate the invention and its advantages, and they should not be interpreted as limiting since further modifications of the disclosed invention will be apparent to those skilled in the art. All such modifications are deemed robe within the scope of the invention as defined by the following claims.

What is claimed is:

1. A thermoplastic, heat shrinkable flexible film, comprising a blend of an amorphous nylon 6I,6T copolymer having no measurable melting point (less than 0.5 calories per gram) or no heat fusion as measured by differential scanning calorimetry, which is present in an amount of from about 10 to about 50 weight percent of said blend, and a copolyamide having a melting point of at least about 145° C. which is selected from the group consisting of nylon 6/12 and nylon 6/66, wherein said film has a shrinkage value in at least one direction of at least 5% at 90° C.

2. A heat shrinkable film, as defined in claim 1, wherein said shrinkage value is at least 20%.

3. A heat shrinkable film, as defined in claim 1, wherein said shrinkage value is at least 20% in both the machine direction and the transverse direction.

4. A heat shrinkable film, as defined in claim 1, wherein said copolyamide has a melting point between about 145° C. and about 215° C.

5. A heat shrinkable film, as defined in claim 1, wherein said copolyamide has a melting point between about 195° C. and about 200° C.

6. A heat shrinkable film, as defined in claim 1, wherein said copolyamide is present in an amount of from about 24 to 90 weight percent.

7. A heat shrinkable film, as defined in claim 1, wherein said copolyamide is present in an amount of from about 40 to 90 weight percent.

8. A heat shrinkable film, as defined in claim 1, further comprising in said blend an additional nylon 6/12 copolyamide having a melting point less than 145°.

9. A heat shrinkable film, as defined in claim 1, further comprising in said blend nylon 6, nylon 11, or nylon 12 in an amount of from 10 to 30 percent of said blend.

10. A heat shrinkable film, as defined in claim 1, wherein said film is uniaxially oriented.

11. A heat shrinkable film, as defined in claim 1, wherein said film is biaxially oriented.

12. A heat shrinkable film, as defined in claim 1, wherein said film is irradiated at a dosage of about 1 to about 5 mrad.

* * * * *